US007189578B1

(12) United States Patent
Feng et al.

(10) Patent No.: US 7,189,578 B1
(45) Date of Patent: Mar. 13, 2007

(54) METHODS AND SYSTEMS EMPLOYING ELECTROTHERMALLY INDUCED FLOW FOR MIXING AND CLEANING IN MICROSYSTEMS

(75) Inventors: Jianjun Feng, Huntsville, AL (US); Sivaramakrishnan Krishnamoorthy, Huntsville, AL (US); Vinod Bhagwan Makhijani, Huntsville, AL (US)

(73) Assignee: CFD Research Corporation

( * ) Notice: Subject to any disclaimer, the term of this patent is extended or adjusted under 35 U.S.C. 154(b) by 342 days.

(21) Appl. No.: 10/307,907

(22) Filed: Dec. 2, 2002

(51) Int. Cl.
*G01N 1/00* (2006.01)
*G01N 1/10* (2006.01)
*G01N 35/00* (2006.01)
*H05F 3/00* (2006.01)
*B01D 57/02* (2006.01)

(52) U.S. Cl. ........................ 436/174; 422/50; 422/68.1; 422/81; 422/82; 422/100; 422/101; 422/102; 422/104; 29/592; 29/592.1; 436/43; 436/174; 436/180; 204/164; 204/450; 204/458; 204/477

(58) Field of Classification Search .................. 422/50, 422/68.1, 81, 82, 100, 101, 102, 104; 29/592, 29/592.1; 436/43, 174, 180; 204/164, 450, 204/458, 477
See application file for complete search history.

(56) References Cited

U.S. PATENT DOCUMENTS 4,202,740 A 5/1980 Stoner et al.
4,921,544 A 5/1990 Cowle et al.
5,252,291 A 10/1993 Tsao
5,457,854 A * 10/1995 Easom ........................ 24/300
5,681,457 A 10/1997 Mahoney
5,803,600 A * 9/1998 Schubert et al. ............ 366/144
5,810,985 A 9/1998 Bao et al.
5,858,195 A * 1/1999 Ramsey ...................... 204/601
5,869,004 A 2/1999 Parce et al.
5,888,370 A 3/1999 Becker et al.
5,993,630 A 11/1999 Becker et al.
5,993,632 A 11/1999 Becker et al.
6,004,515 A 12/1999 Parce et al.
6,007,771 A 12/1999 Rehmeyer et al.
6,010,607 A * 1/2000 Ramsey ...................... 204/435
6,017,765 A 1/2000 Yamada et al.
6,056,859 A 5/2000 Ramsey et al.
6,062,261 A 5/2000 Jacobson et al.

(Continued)

*Primary Examiner*—Brian Sines
(74) *Attorney, Agent, or Firm*—Tomas Friend

(57) ABSTRACT

A method and system for controlling flow motion in a channel/cavity in a microfluidic system includes positioning at least one pair of electrodes in and/or proximate to the channel/cavity. A buffer solution is placed in the channel/cavity, the buffer solution having at least one dielectric property that varies in response to changes in temperature of the solution. An AC/DC voltage is applied to the electrodes to generate an electric field in the channel/cavity; the AC voltage having a known magnitude and frequency and the DC voltage having a known magnitude. The magnitude of the AC/DC voltage is adjusted to cause Joule heating of the buffer solution in the channel/cavity. The geometry and position of the electrodes is adjusted to generate a temperature gradient in the buffer solution, thereby causing a non-uniform distribution of the dielectric property within the solution in the channel/cavity. The dielectric non-uniformity produces a body force and flow in the solution. Also, the frequency of the AC voltage is adjusted to generate flow of the buffer solution in the channel/cavity in response to the non-uniform distribution of the dielectric property.

13 Claims, 13 Drawing Sheets

U.S. PATENT DOCUMENTS

| | | | | |
|---|---|---|---|---|
| 6,086,243 | A | 7/2000 | Paul et al. | |
| 6,086,825 | A | 7/2000 | Sundberg et al. | |
| 6,149,870 | A | 11/2000 | Parce et al. | |
| 6,186,659 | B1 | 2/2001 | Schembri | |
| 6,210,640 | B1 | 4/2001 | Ruth et al. | |
| 6,241,379 | B1 * | 6/2001 | Larsen | 366/181.5 |
| 6,274,089 | B1 | 8/2001 | Chow et al. | |
| 6,287,832 | B1 | 9/2001 | Becker et al. | |
| 6,299,747 | B1 | 10/2001 | Dunayevskiy et al. | |
| 6,306,272 | B1 | 10/2001 | Soane et al. | |
| 6,408,884 | B1 * | 6/2002 | Kamholz et al. | 137/827 |
| 6,415,821 | B2 * | 7/2002 | Kamholz et al. | 137/827 |
| 6,682,214 | B1 * | 1/2004 | Vivek et al. | 366/108 |
| 6,733,172 | B2 * | 5/2004 | Lee et al. | 366/341 |
| 6,851,846 | B2 * | 2/2005 | Fujii et al. | 366/173.2 |
| 6,877,892 | B2 * | 4/2005 | Karp | 366/341 |
| 6,880,576 | B2 * | 4/2005 | Karp et al. | 137/806 |
| 6,887,384 | B1 * | 5/2005 | Frechet et al. | 210/634 |
| 6,890,093 | B2 * | 5/2005 | Karp et al. | 366/336 |
| 2002/0023841 | A1 | 2/2002 | Ahn et al. | |
| 2002/0079224 | A1 | 6/2002 | Chen et al. | |
| 2003/0086333 | A1 * | 5/2003 | Tsouris et al. | 366/173.1 |

* cited by examiner (a)

(b)

(a)

(b)

METHODS AND SYSTEMS EMPLOYING ELECTROTHERMALLY INDUCED FLOW FOR MIXING AND CLEANING IN MICROSYSTEMS

A portion of the disclosure of this patent document contains material that is subject to copyright protection. The copyright owner has no objection to the facsimile reproduction by anyone of the patent document or the patent disclosure, as it appears in the Patent and Trademark office patent file or records, but otherwise reserves all copyright rights whatsoever.

BACKGROUND OF THE INVENTION

1. Field of the Invention

The present invention relates generally to devices and methods used for mixing and cleaning in microfluidic systems. More particularly, this invention pertains to employing electrothermally induced flow to enhance mixing of chemical and biological samples and cleaning in microscale devices.

2. Description of the Prior Art

Miniaturized bioanlytical or Bio-Micro Electro Mechanical Systems ("BioMEMS") (hereafter collectively referred as microdevices) are used to perform various functions such as a simple mixing of two or more analytes or liquid streams (hereafter collectively referred as samples) to a more complex biochemical assay that can include immunoassays, DNA hybridization, and general cell-molecule interactions. These devices incorporate many of the necessary components on a single platform, known as a biochip or microfluidic chip (hereafter collectively referred as microfluidic system). The term "microfluidic" is commonly used if at least one characteristic dimension of the device is in micron size. Typical biochip components known in the art include reaction chambers, pumps, micromixers, pre-concentrators, interconnects, separators, and sensors. The successful implementation of a biochemical assay using a microfluidic system is determined in terms of parameters that can include overall assay time, recovery time, sensitivity, selectivity, and accuracy.

In microdevices, samples are usually mixed as a part of an assay protocol. The time taken to accomplish this task, known as "mixing time", is determined by the diffusion coefficient (usually a very small value) of the samples, their flow speed, and residence time inside the device. This time can form a significant portion of the "overall assay time". In this regard, there is a need for methods and systems that will facilitate rapid mixing so that overall assay time may be reduced. Preferably, such devices should contain no moving parts.

A second performance parameter is the recovery time, which is defined as the time taken for the device to get ready before analyzing next set of samples. This requires cleaning of the device. In this aspect also, there is a similar need for systems and methods that will facilitate efficient cleaning.

Most conventional micromixing systems can be classified as either active or passive. Passive mixers use molecular diffusion of samples, and consequently take a very long time to accomplish mixing. Active mixers use externally imposed forcing mechanisms, such as a pressure pulse or an oscillatory flow, and therefore take a relatively short time to accomplish mixing. Known methods of micromixing include electroosmotic flow (electrohydrodynamic instabilities), static lamination (diffusional forces as mixing mechanism), and injection of one liquid into another liquid with microplumes.

Passive mixers do not have any moving parts, in contrast to active devices where moving parts are activated either by a pressure or by an electric field. Passive mixers use channel geometry to increase residence time. Passive micromixers are further subdivided into in-plane and out-of-plane mixers. In-plane mixers divide and mix various liquid streams in one dimension while out-of-plane mixers use three-dimensional channel geometries to enhance mixing. The simplest passive in-plane mixer is a one that merges two different liquid streams into a single channel and accomplishes mixing via molecular diffusion.

Cleaning methods that are conventionally practiced in the industry include ultrasonic cleaning and vacuum washing.

What is needed, then, are methods and systems for inducing flow in a microfluidic system that use no moving parts, are easy to control, and that do not require special treatment of surfaces in the system.

SUMMARY OF THE INVENTION

The present invention provides a novel method and system for inducing and controlling flow motion in a cavity or channel (hereafter referred to as a channel) in a microfluidic system. A cavity can be considered as a subset of a channel where one or both ends may be closed. A channel can have any cross sectional area, including square, rectangular, trapezoidal, circular or curved. The method of the invention includes positioning at least one pair of electrodes in and/or proximate to the channel. A liquid medium (hereafter referred to as a buffer) is contained inside the device. The buffer solution has at least one dielectric property that varies in response to the temperature of the solution. When an electric field, is applied to the buffer, it induces a temperature gradient in the buffer solution due to Joule heating. The applied electric field can be one of the following (a) a direct current (DC) characterized by the magnitude of applied voltage;

(b) a time varying direct current characterized by the magnitude and frequency of the applied voltage, and a having a waveform that can be sinusoidal, square, pulse, saw-toothed, or combination thereof; or (c) an alternating current (AC) characterized by magnitude and frequency of applied voltage and a waveform that can be sinusoidal, square, pulse, saw-toothed or combination thereof.

The Joule heating, in turn, induces variations in the dielectric property of the buffer. The variation in the dielectric property exerts a force on the buffer and, consequently, a flow motion is observed. This motion is called an electrothermal flow. The present invention utilizes this electrothermally induced flow motion to accomplish the processes of mixing or cleaning. The magnitude, frequency and waveform of the electric field, the geometry and position of the electrodes, and geometry of the channel may be adjusted to generate a desired temperature gradient, hence desired flow, in the buffer solution.

The present invention includes a method of designing a microfluidic system to provide controllable flow motion in a buffer solution inside a channel having a fixed geometry. The designer begins by selecting either a buffer solution having a known viscosity, density and a temperature dependent dielectric property, or an electric power source having a voltage of known magnitude, frequency, and waveform. The designer then proposes a geometry of the device and a location and shape for at least one pair of electrodes to be placed in a position proximate the channel. The electrodes are connected to the electric power source. A target function that includes a desired temperature gradient inside the buffer solution and a uniformity of concentration of samples in the channel is defined. A computer simulation of the system is performed, using the selected system parameters. The simulation includes performing an optimization procedure on the target function. Following the initial simulation, the position of the electrodes can be adjusted in response to outcome. The design can further be optimized by adjusting one or more of the other system parameters, including the magnitude, frequency, and waveform of the electric voltage, and electrode shape and size, in response to performing the simulation of the system.

The use of electrothermal flows in a microfluidic system offers several advantages and benefits. First, no moving parts are involved in such systems. Also, such systems have low power requirements. For example, an electrode voltage in the range of 1 Vrms and frequency of $10^6$ Hz (of an AC field) is able to induce a flow field with maximum velocity of 100 □m/sec in microdevices. Electrothermal flow provides an ease of control. Process parameters that induce electrothermal flows are easier to measure. This allows the control of device functionality to be accomplished with ease, for example, by rearranging the electrode configuration and changing the applied electric field.

A further benefit of using electrothermal flow is that there is no need for special treatment of the channel surfaces. The flow is induced within a region of non-uniform temperature gradient and is independent of more complicated surface phenomena. This means that no complex surface modifications are needed, as required in several commercial BioMEMS devices and therefore, is relatively easy to implement.

BRIEF DESCRIPTION OF THE DRAWINGS

FIG. 13(*b*) shows the resulting washing velocity over time in the embodiment of a cleaning system having an electrode pair that is energized in accordance with FIG. 13(*a*).

DESCRIPTION OF THE PREFERRED EMBODIMENTS

Figure 1:
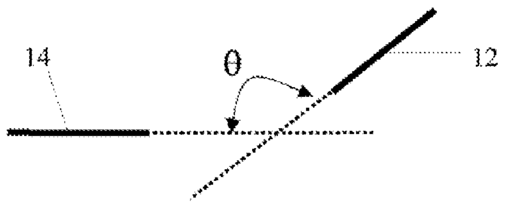
FIG. 1 is a diagram showing the geometric relationship between electrodes in an electrode pair used in the system and method of the invention to electrothermally induce flows in a microfluidic system.

Traditionally, microdevices use electric fields (AC or DC) as a source of energy to induce flow of buffer using electroosmosis, transport and separation of samples using electrophoresis, or transport of particles using dielectrophoresis. In this context, the present invention focuses on the use of an electric field to facilitate the transport and mixing of two or more analytes or liquid streams, as well as cleaning (removal of particles or analytes) of devices using electrothermally induced fluid flow.

Electrothermally Induced Fluid Flow

When an electric field is applied to a buffer, it induces a temperature gradient in the buffer solution due to Joule heating. This, in turn, induces variations (non-uniformities) in the dielectric property of the buffer. The non-uniformity in the dielectric property results in a body force being exerted on the liquid and, consequently, a flow motion is observed. The present invention utilizes this electrothermally induced flow motion to accomplish the processes of mixing or cleaning.

Dielectric materials experience an electrostatic force ($\vec{f}$) in an electric field as described by:

$$\vec{f} = \rho\vec{E} - \frac{1}{2}E^2\nabla\varepsilon + \frac{1}{2}\nabla\left[\rho_m\left(\frac{\partial\varepsilon}{\partial\rho_m}\right)_T E^2\right]$$

where $\rho_m$ is the material mass density, ρ is the charge density, ∈ is the permittivity, T is the temperature, $\vec{E}$ is the applied electric field, and ∇ is the gradient operator. If we assume the non-uniformity of the dielectric properties arises from their temperature dependence, we derive a first order approximation of body force exerted on the buffer as (A. Ramos, H. Morgan, N. G. Green, A. Castellanos, "AC Electrokinetics: A Review of Forces in Microelectrode Structures", Journal of Physics D, Vol 31, pp. 2338–2353 (1998), incorporated herein by reference):

$$\vec{f} = \frac{1}{2}\mathrm{Re}\left[\frac{\sigma\varepsilon(\alpha-\beta)}{\sigma+i\omega\varepsilon}(\nabla T\cdot\vec{E}_0)\vec{E}_0^* - \frac{1}{2}\varepsilon\alpha|\vec{E}|^2\nabla T\right]$$

where $$\alpha = \frac{1}{\varepsilon}\frac{\partial\varepsilon}{\partial T},\quad \beta = \frac{1}{\sigma}\frac{\partial\sigma}{\partial T}$$

Here, ω is the frequency of the applied electric field, σ is the conductivity of the media, Re represents the real part, and □ and □ are the coefficients of variation of electrical permittivity and conductivity with respect to temperature, respectively. The resulting motion of the buffer and subsequent temperature and electric field distribution can be computed by solving conservation equations for mass and momentum (Navier-Stokes Equations), and thermal and electrical energy of the buffer solution (Ronald F. Probstein, *Physicochemical Hydrodynamics, An Introduction*, Second Edition, John Wiley & Sons, Inc., New York, N.Y. (1994), incorporated herein by reference).

This body force will contribute to the fluid motion governed by the Navier-Stokes equations:

$$\rho_m\left[\frac{\partial\vec{u}}{\partial t} + (\vec{u}\cdot\nabla)\vec{u}\right] = -p + \mu\nabla^2\vec{u} + \vec{f},\ \nabla\cdot\vec{u} = 0$$

The thermal field is governed by the convection-diffusion equation:

$$\rho_m c_p\frac{\partial T}{\partial t} + \rho_m c_p(u\cdot\nabla)T = k\nabla^2 T + \sigma E^2$$

From the governing equations (Probstein, 1994) for fluid flow, electric field, and heat transfer, it can be seen that control of electrothermal flow in microfluidic systems will depend at least on:

Thermal properties (heat capacity, thermal conductivity) of the buffer solution as well as those of the material of the microdevice (such as glass, plastic, silicon, etc.);

Dielectric properties (permittivity, electric conductivity) of the buffer solution as well as their variation on temperature change;

The magnitude, frequency and waveform of the applied electric field;

Hydrodynamic properties (density and viscosity) of the buffer solution; and

Geometry of the flow region as well as electrode configuration.

Successful utilization of electrothermal effects to regulate flow within a microfluidic system relies on a correct choice of one or more of these parameters. For most applications, the thermal properties of the buffer solution are very close to those of water. The metal electrodes exhibit a much higher thermal conductivity as compared to glass, plastics or silicon, which are the materials most widely used in fabricating microdevices. Thus, thermal transfer within these materials can be discounted so that the materials are treated as being thermally insulated. Once the thermal parameters are chosen, the temperature change in the buffer solution will be determined primarily by the applied electric field. In Microsystems for biological applications, the temperature change should often be maintained within a certain range, typically less than two degrees. Because the typical geometry for which electrothermal flow is most effective involves dimensions measured from tens of microns to hundreds of microns (this also being the range for electrode dimensions), the applied electric potential should range from a few volts to tens of volts.

The dielectric properties of the buffer solution are fixed in most applications, although in some cases a specific material (such as an electrolyte) is added to modify the electrical conductivity. The variations in conductivity and permittivity as a function of temperature (α, β) can be found in the literature for most standard buffer solutions. For materials other than water, these two parameters may be different and must be determined by experimental measurement. The hydrodynamic properties of the buffer, such as the viscosity, are also fixed for a known buffer solution.

The applied electric field can be one of the following (d) a direct current (DC) characterized by the magnitude of applied voltage;

(e) a time varying direct current characterized by the magnitude and frequency of the applied voltage, and a having a waveform that can be sinusoidal, square, pulse, saw-toothed, or combination thereof; or (f) an alternating current (AC) characterized by magnitude and frequency of applied voltage and a waveform that can be sinusoidal, square, pulse, saw-toothed or combination thereof.

From the expression of the electrothermal force applied to the buffer solution, the force changes sign, in the case of an AC applied electric field, as the frequency increases from zero to infinity. For most applications, the critical frequency, where the force changes direction, is in the order of megahertz and the transition band is quite sharp. Therefore, the frequency of the AC field can be in the kilohertz to gigahertz range, depending on what is needed to control the flow.

System Design

When applying electrothermal flow to facilitate mixing and cleaning, the physics of the flow for a basic electrode structure should be understood. Because of the complex interactions among the electric, thermal and flow fields, it is only possible to solve analytically the electrothermally induced flow in a simple electrode configuration. An exact solution of electrothermal flow in the vicinity of a pair of elongated electrodes (kept along the surfaces of a wedge), which are separated by a gap of the same width as the electrode, can be straightforwardly constructed. The flow field is fundamentally characterized by a pair of oppositely circulating zones above each of the electrodes. The direction of circulation direction depends on the direction of the electrothermal force. The easiest way to control the flow direction is to change the AC field frequency. Depending on the frequency, the flow can move toward or away from the center of the electrode. Because of the incompressibility of the flow, the fluid is expelled away or pulled toward the gap between the electrodes. The size of the circulation zone is approximately the same order of the size of the electrode. It is anticipated that the flow structure shares a similar topology for a pair of electrodes fabricated on each of the surfaces of a wedge region. For an array of periodical, co-planar electrode strips, the electrothermal flow is characterized by an array of circulating zones above each electrode. The direction of the flow is reversed for adjacent electrodes. The circulating zones are squeezed along the electrodes and therefore, they stretch in other directions. In general, the circulating zones are of comparable size to the electrode dimensions.

Although the local electrothermal force increases as the electrode gap decreases, the circulating zones are localized near the tips of the electrodes. This tends to work against a thorough mixing of fluid that is separated from the electrodes. In practice, however, the dimensions and the gap of the electrodes should be comparable with the other dimensions of the channel.

Figure 11:
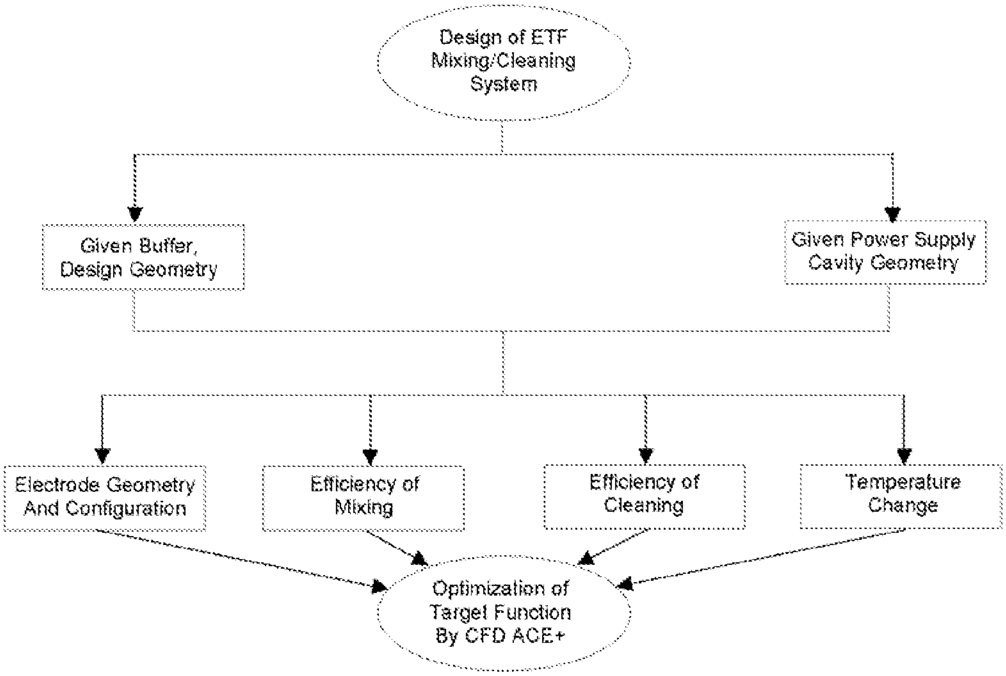
FIG. 11 is a flow chart showing one embodiment of a method of designing a microfluidic system that uses electrothermal flow for cleaning/mixing within cavities or channels in the system.

In general, issues that must be addressed for a successful design of a mixing or cleaning microfluidic system using electrothermal flow are summarized in the diagram shown in FIG. 11. The design of a mixing or cleaning system can be divided into two major categories: one based on a fixed buffer solution and another based on a fixed electric power source. Thus, an initial determination is whether the design is constrained by use of a specific buffer solution and channel geometry, or by use of a specific power source and channel geometry. Next, a key element of the design is the appropriate choice of electrode configuration, as well as correct values for adjustable parameters in order to achieve optimized performance of either a mixing or cleaning system. For design purposes in each category, it is assumed that the dimensions of the cavity are fixed Accordingly, the adjustable parameters will be the magnitude of the voltage applied to the electrodes, the frequency of the applied voltage, the voltage waveform, and/or the dielectric properties of the buffer. A change of conductivity can be achieved by adding electrolyte to the buffer. A change in frequency of the field will alter the flow direction. In all applications, the temperature change in the buffer should be minimized so that the biological samples will not be damaged. The efficiency of mixing or cleaning should be as high as possible.

All of these factors form a complicated optimization problem with certain restrictions. Accordingly, a preferred embodiment of the invention includes simulation of the proposed system using computational fluid dynamics (CFD) techniques and tools. For example, CFD-ACE+ multiphysics software developed and marketed by CFD Research Corporation, Huntsville, Ala., and its capability of optimization, can be used to determine the most suitable parameters. The CFD-ACE+ software modules of particular relevance to the present invention are fluid flow, heat transfer, multiple species transport, bio- and electro-chemistry, particle transport, and electrostatics.

Simulation-based process and device design is a rapidly emerging paradigm shift in the biotechnology and medical device industries. This design method relies on solving the laws of underlying complex, interacting, physico-chemical phenomena, and creating "virtual" device/process models. Compared to traditional empirical and laboratory analysis, this method provides a fundamental and detailed understanding of the device or process performance. A typical simulation-based design and optimization process for purposes of designing a microfluidic device using electrothermal flow consists of three basic steps:

(1) The designer creates a geometric representation of the system. The device is sub-divided into discrete non-overlapping three-dimensional cell volumes with the help of a computational mesh using a geometric grid generation tool.

(2) The governing system of nonlinear partial differential equations that describe fluid flow, heat transfer, multiple species transport, bio- and electro-chemistry, particle transport and electrostatics is solved. Simulations are performed for the prescribed values of process conditions such as magnitude, frequency and waveform of the applied electric field, buffer and analyte flow rates, and physical and chemical properties of the buffer and the analyte. In addition to these, the orientation and the number of electrodes can also be varied, and their implications on system performance can be analyzed.

(3) Finally, the performance of the device is analyzed using the post-processing tool.

If the performance of the system is found to be unsatisfactory, the designer will change either the process conditions and repeat steps 2 and 3; or will change the system geometry and repeat steps 1 through 3, until optimal (desired) performance is achieved. Steps 1 through 3 will be repeated if the number and orientation of the electrodes are changed.

Examples are provided below for design of mixing and cleaning systems using CFD design and simulation techniques in accordance with the invention. A 100 kHz AC electric field is used for each simulation.

Mixing

Figure 7:
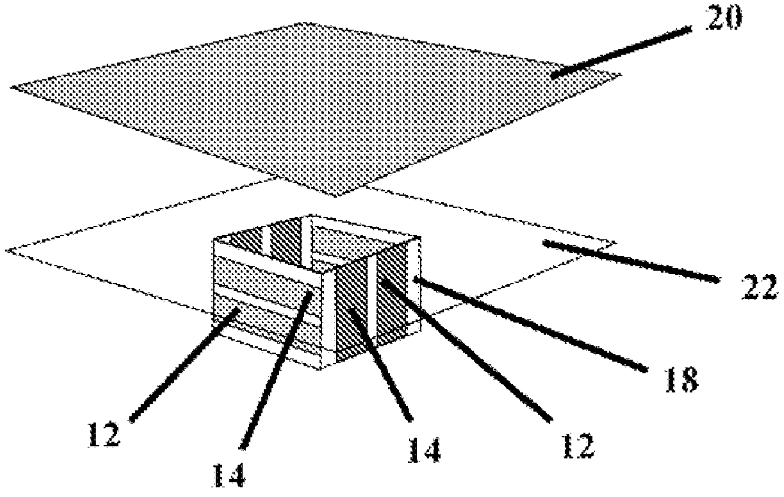
FIG. 7 is an oblique cutaway view of a rectangular cavity in a microfluidic system with multiple electrode pairs arranged on the cavity walls to electrothermally induce mixing of liquids in the cavity.
Figure 8:
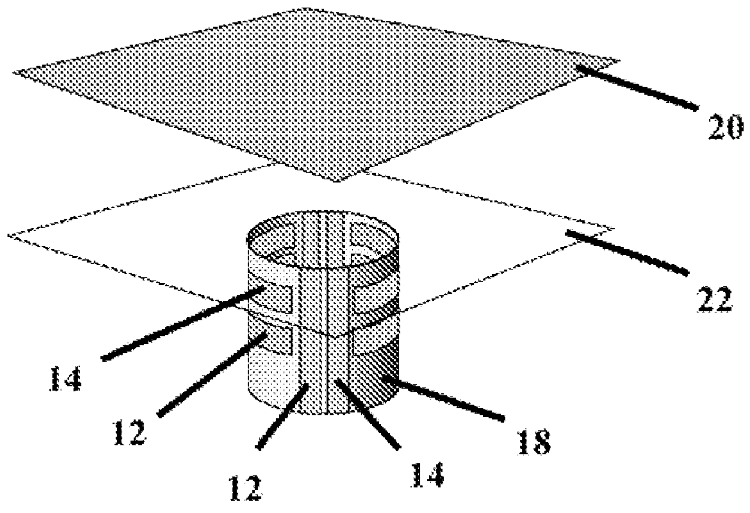
FIG. 8 is an oblique cutaway view of a cylindrical cavity in a microfluidic system with multiple electrode pairs arranged on the cavity wall to electrothermally induce mixing of liquids in the cavity.

A rectangular cavity 18 is shown in FIG. 7 positioned proximate an upper substrate 20 and lower substrate 22 in a microfluidic system. Multiple electrode pairs 12, 14 are fabricated on each surface of the cavity 18. In the embodiment shown in FIG. 7, the electrode pairs 12, 14 on two of the opposed side walls of the cavity 18 are oriented vertically. The electrode pairs 12, 14 on the other opposed side walls of the cavity 18 are oriented horizontally. In FIG. 8, a cylindrical cavity 18 is shown, with multiple electrode pairs 12, 14 oriented both vertically and horizontally on the cylinder wall.

The electrode pairs 12, 14 are electrically connected to an AC voltage source (not shown) that generates a voltage having a magnitude and frequency that are selectable/controllable by the designer/user in order to provide the desired flow motion control in accordance with the design criteria as described herein. In either embodiment, in order to provide the desired flow control the electrode pairs 12, 14 can be energized by the AC voltage source to work simultaneously, or they can be activated periodically.

In one embodiment, two buffer solution species SPA (1 nM) and SPB (3 nM) occupy the top and bottom half of a 200 micron×100 micron rectangular cavity. The solutions have diffusivities of 1 and 3E−10 $m^2/s$, respectively. An AC voltage of 5 Vrms is applied to the electrodes. Model parameters are:

$$\epsilon_r=80, \sigma=560\ \mu S/cm, k=0.6\ W/m\ K, C_p=4180\ J/Kg\ K$$

Figure 3:
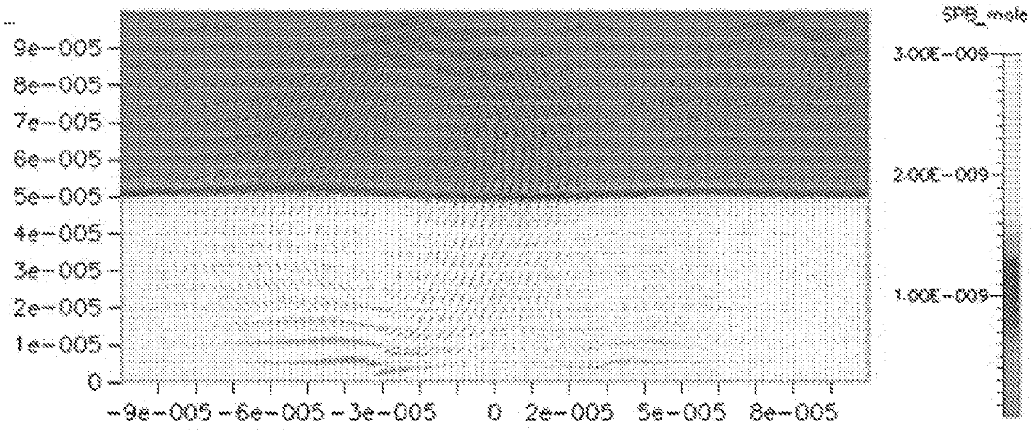
FIGS. 3(*a*) and 3(*b*) are contour plots of SPA species concentration at t=0.025, using a micromixing simulation model in accordance with the invention, wherein two buffer solution species SPA (1 nM) and SPB (3 nM) occupy the top and bottom half of a 200 micron×100 micron rectangular cavity. The solutions have diffusivities of 1 and 3E−10 $m^2/s$, respectively. A voltage of 5 Vrms is applied to the electrodes.
Figure 3:
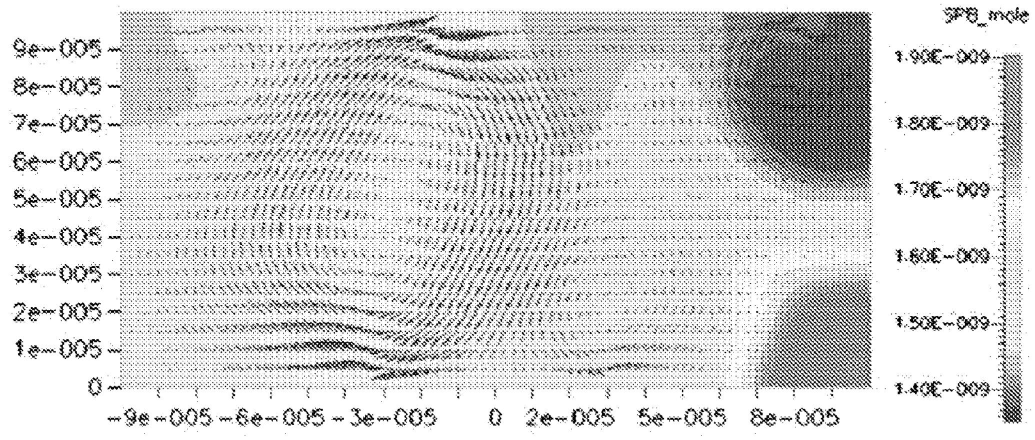

The resulting flow field is shown in FIG. 3, with a maximum induced velocity of 200 microns/sec due to electrothermal effects. The contour plot of species concentration for SPA is also shown at t=0.025 (FIG. 3(*a*)) and 5*s* (FIG. 3(*b*)).

Figure 16:
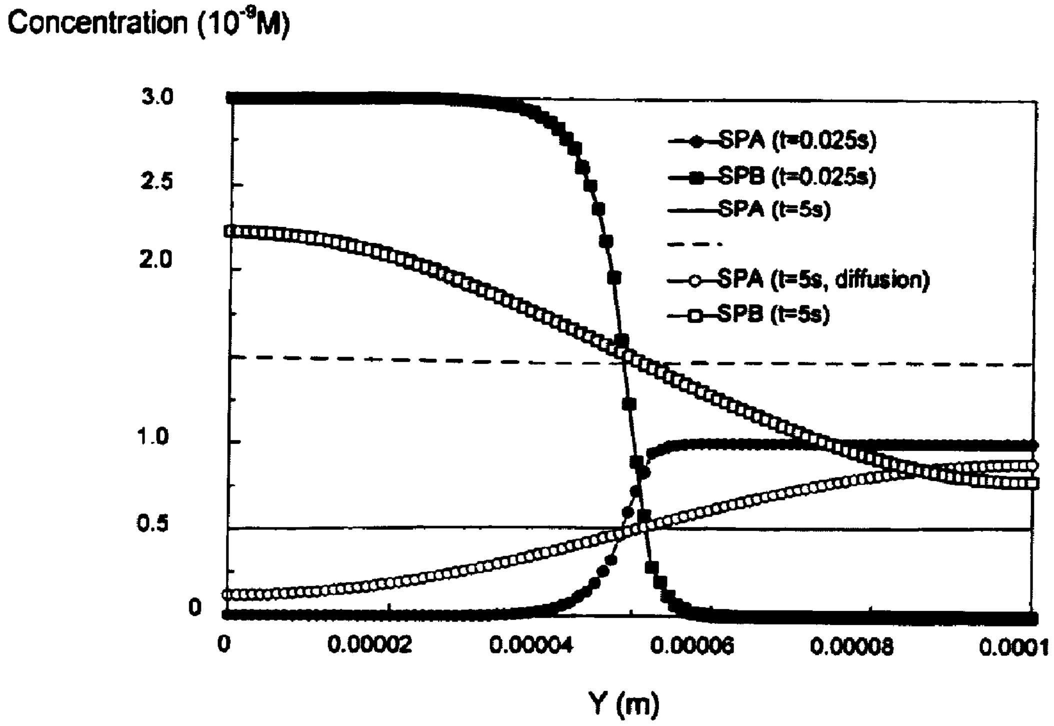
FIG. 16 shows simulation results for mixing with and without electrothermal flow.

A concentration profile along the vertical axis at the center of the device is shown for both species SPA and SPB in FIG. 16. A detailed analysis of this case study clearly indicates that 97% of mixing can be accomplished in less than 2 seconds. If the mixing were allowed to happen by pure diffusion, it would have taken more than 10 seconds to achieve this level (97%) of mixing.

Figure 15:
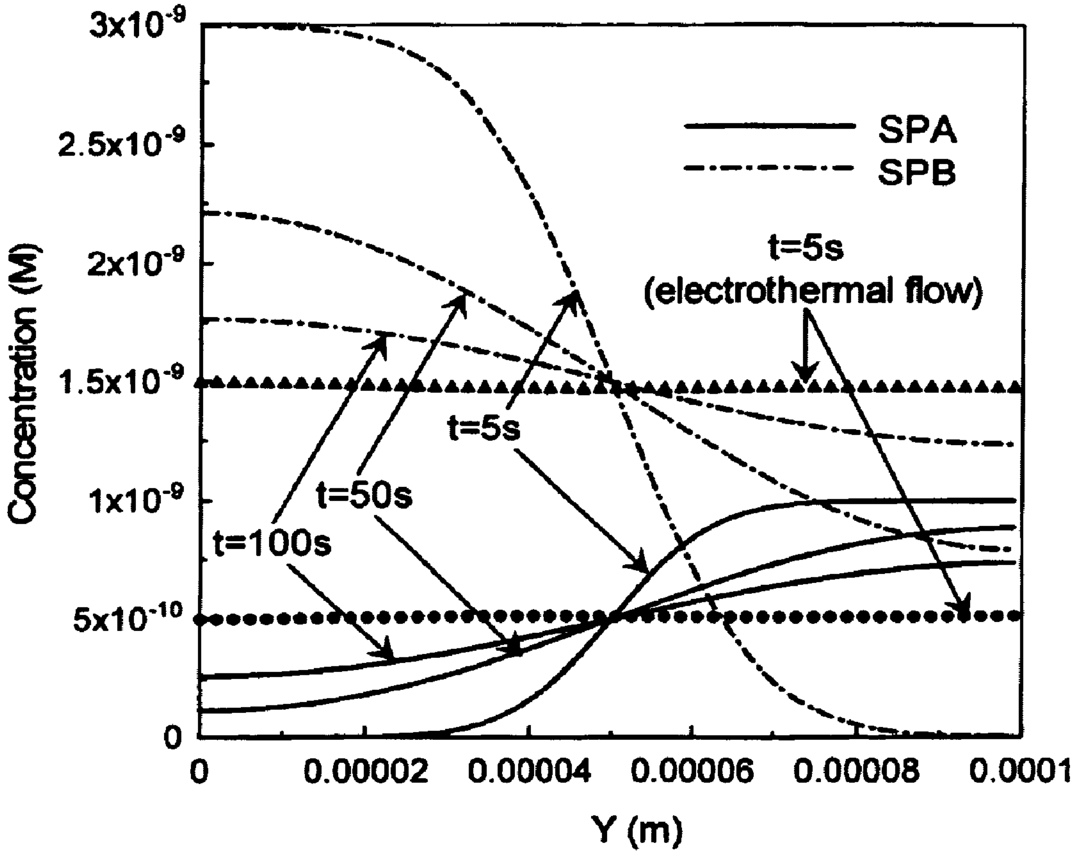
FIG. 15 shows the results of a mixing simulation and enhanced mixing with electrothermal flow.

Note that the diffusion coefficients used for both species would classify them as small molecules. For macromolecules, such as proteins, the diffusion coefficient is expected to be at least an order of magnitude smaller, which would make the present invention even more effective (i.e. mixing time reduced by more than two orders of magnitude). Such results are presented in FIG. 15 whereby mixing that is faster by an order of magnitude is achieved by electrothermally induced flow.

Figure 4:
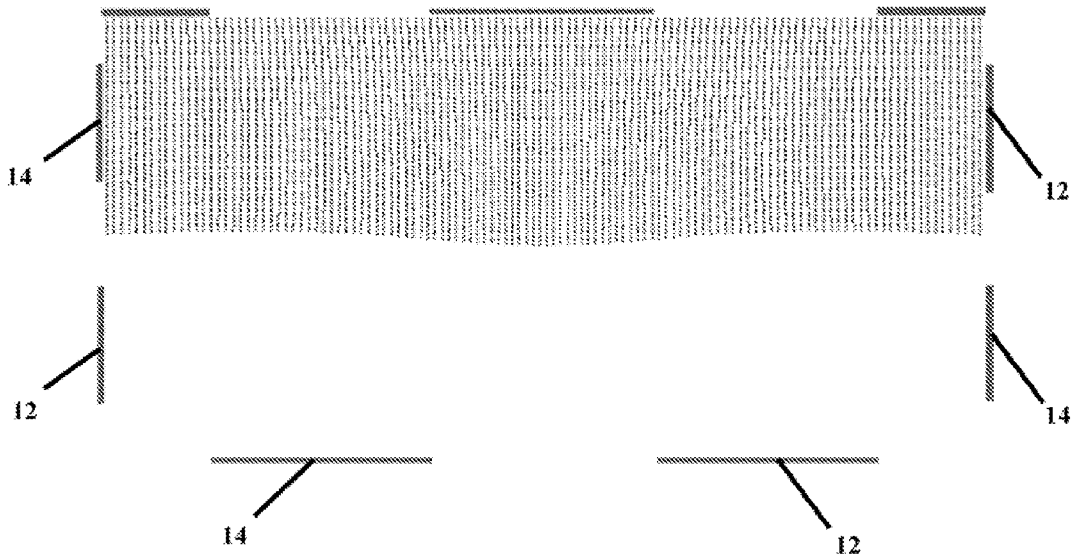
FIG. 4 illustrates a tracer configuration in a simulation model of an electrothermal mixing system, before mixing occurs.
Figure 12:
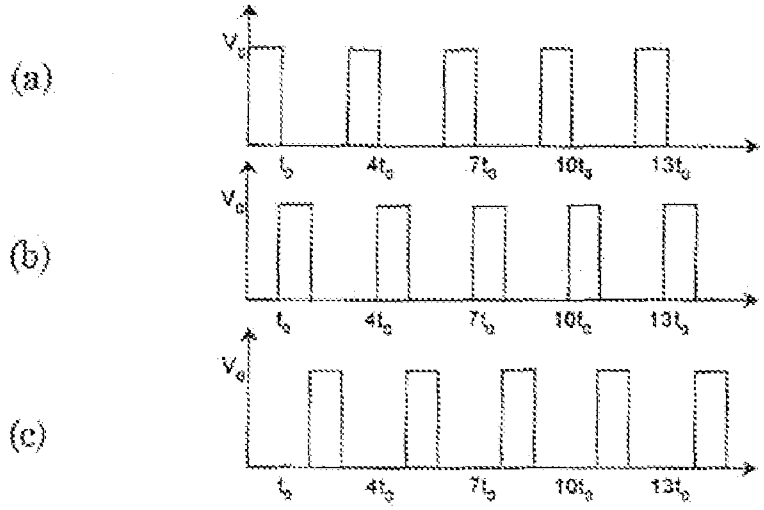
FIGS. 12(*a*)–(*c*) are timing diagrams showing the voltage applied to the electrodes on the lower (FIG. 12(*a*)), top (FIG. 12(*b*)) and side walls (FIG. 12(*c*)) for electrothermally inducing mixing in a rectangular cavity.
Figure 14:
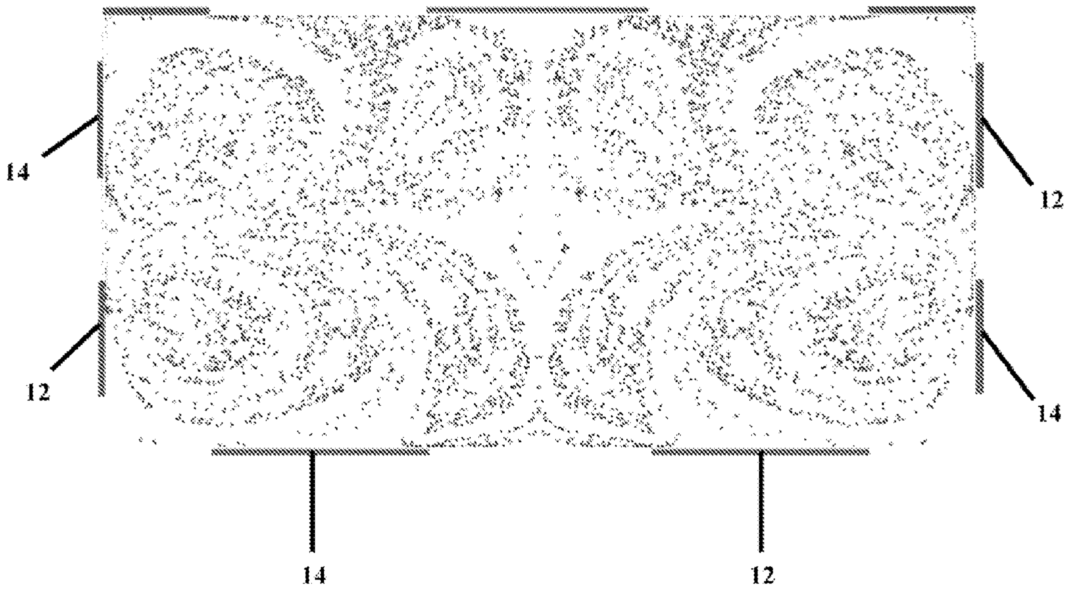
FIG. 14 illustrates the mixing of the species shown in FIG. 4, after two periods of applying a periodic AC field to the cavity.

As a further example, the electrode configuration in a rectangular cavity as shown in FIG. 7 produces more effective mixing. FIG. 12 shows the voltage applied to the electrodes on the lower (FIG. 12(*a*)), top (FIG. 12(*b*)) and side walls (FIG. 12(*c*)) of the cavity, which varies periodically with a periodicity of 3 $t_0$. In this embodiment, as shown by the timing of the applied voltages in FIG. 12, the electric fields are sequentially generated at the cavity surfaces. Thus, the fields generated at these electrodes will stretch and fold the fluid within the cavity and the boundary of tracers which initially occupy the upper half of the cavity increases exponentially, which is strong evidence of chaotic flow. FIG. 4 shows the tracer configuration before mixing and FIG. 14 illustrates the tracer configuration relative to electrode pairs 12, 14 after only two periods. In this embodiment, the cavity dimensions are 200 microns×400 microns, and $t_0$=2 s. Other parameters are the same as described above.

Figure 6:
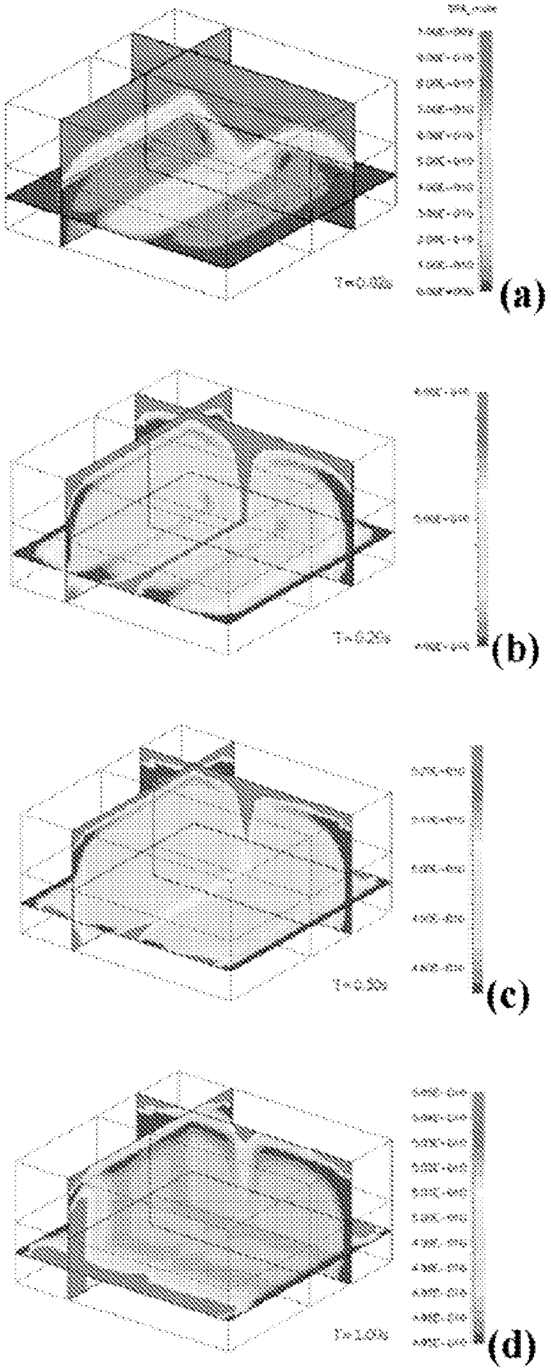
FIGS. 6(*a*)–(*d*) graphically illustrate a three-dimensional simulation of mixing of two species in a microfluidic system in accordance with the present invention. The two species, SPA (C=1 nM, D=$2\times10^{-12}$ $m^2/s$) and SPB (C=3 nM, D=$4\times10^{-12}$ $m^2/s$), initially occupy the upper and lower half of a rectangular cavity of size 40 microns×40 microns×20 microns. A pair of electrodes is symmetrically placed on the bottom of the cavity. The electrode width is 10 mm. An AC electric field having a nominal frequency of $10^5$ Hz is applied. The peak voltage applied to the electrodes is ±5 V.

FIG. 6 illustrates a three-dimensional simulation of mixing of two species in a microfluidic system. The two species, SPA (C=1 nM, D=$2\times10^{-12}$ $m^2/s$) and SPB (C=3 nM, D=$4\times10^{-2}$ $m^2/s$) initially occupy the upper and lower half of a rectangular cavity of size 40 microns×40 microns×20 microns. A pair of electrodes is symmetrically placed on the bottom of the cavity. The electrode width is 10 mm. An AC electric field of $10^5$ Hz is applied. The peak voltage is ±5V. This field will create a strong electrothermally induced flow with a maximum velocity of approximately 0.7 mm/s. The instantaneous concentration of species A is shown in FIG. 6 for T=0.02 s (FIG. 6(*a*)), 0.20 s (FIG. 6(*b*)), 0.5 s (FIG. 6(*c*)), and 1.0 s (FIG. 6(*d*)), after the electric field is applied. The mixing is excellent and fast in the wide portion of the cavity, except at the corners and in the region close to the cavity walls, where convection is minimum. In practice, more electrodes can be placed on the sidewalls of the cavity to assist mixing in other directions.

In order to achieve optimal mixing while maintaining the temperature change within a certain range, the position of the electrodes on each surface of the cavity should be adjusted. To do this, the designer should define a target function that comprises temperature increase and the uniformity of the concentration. The position of the electrodes will be adjusted based on performing an optimization procedure of this target function. For example, the CFD-ACE+ software provides automatic implementation of the whole process.

Cleaning

Conventional methods of washing microcavities in a channel do not achieve good cleaning efficiency because of the closed circulation of the fluid in the channel. The conventional method to enhance cleaning is to use a time-dependent washing process which attempts to create chaotic flow. Electrothermal induced flow provides an effective way to achieve this objective. By placing one electrode in the channel and another outside but near the channel, a flow is induced which moves locally parallel to the side walls of the channel. This in turn carries along with it any analyte or sample trapped inside the channel, to a location above the opening of the channel, where washing flow will remove them. By repeating this process, i.e., turning the electrothermal flow on and off, the channel can be cleaned.

Figure 9:
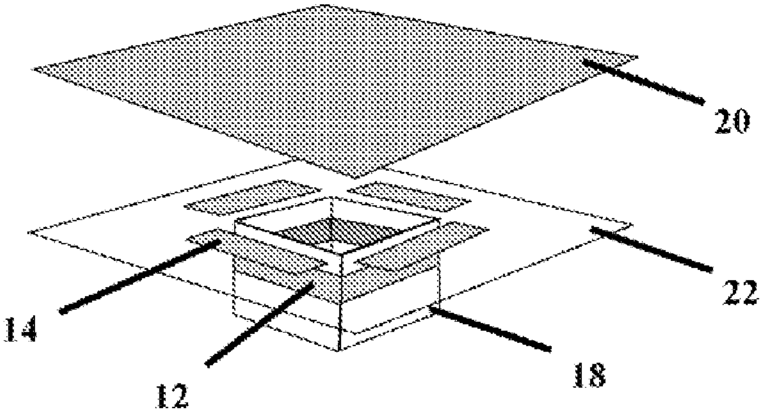
FIG. 9 is an oblique cutaway view of a rectangular cavity in a microfluidic system with multiple electrode pairs arranged on the cavity walls and outside the cavity to electrothermally induce cleaning of the cavity.
Figure 10:
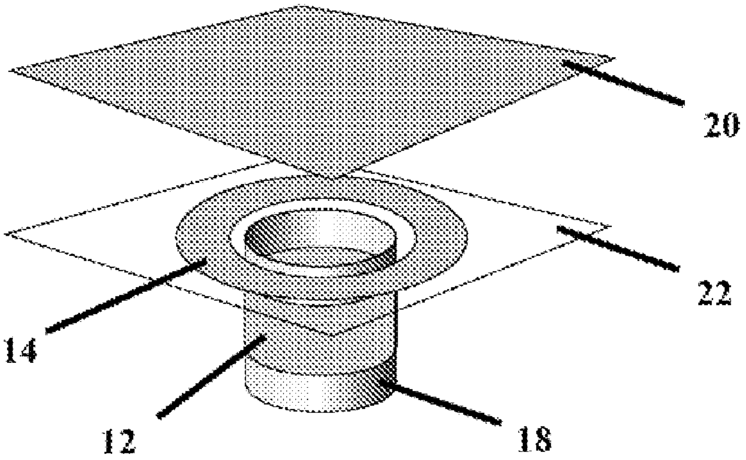
FIG. 10 is an oblique cutaway view of a cylindrical cavity in a microfluidic system with an electrode pair arranged on and proximate to the cavity wall to electrothermally induce cleaning in the cavity.
Figure 13:
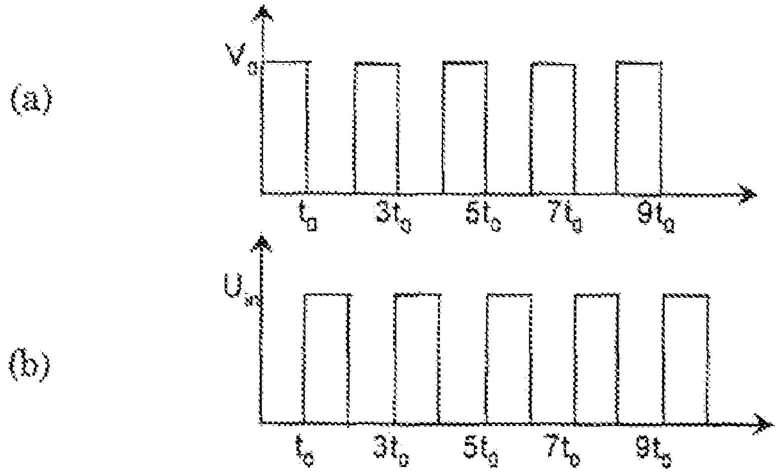
FIG. 13(*a*) is a timing diagram showing the voltage applied to an electrode pair for a cylindrical cavity for purposes of electrothermally inducing cleaning within the cavity.

FIG. 9 illustrates one configuration of multiple electrode pairs 12, 14 positioned with respect to a rectangular cavity 18 proximate an upper substrate 20 and lower substrate 22 in a microfluidic system or array. The first electrode 12 of each electrode pair is positioned on or in the side wall of the cavity 18. The second electrode 14 of each electrode pair is positioned proximate to the cavity opening outside the cavity. Each pair of electrodes 12, 14 is electrically connected to an AC voltage source (not shown) to induce electrothermal flow for purposes of cleaning the cavity 18. FIG. 10 shows an alternative electrode configuration for use with a cylindrical cavity 18. FIG. 13(*a*) shows the applied voltage and FIG. 13(*b*) shows the resulting washing velocity over time in one embodiment of a cleaning system in accordance with the invention.

Figure 5:
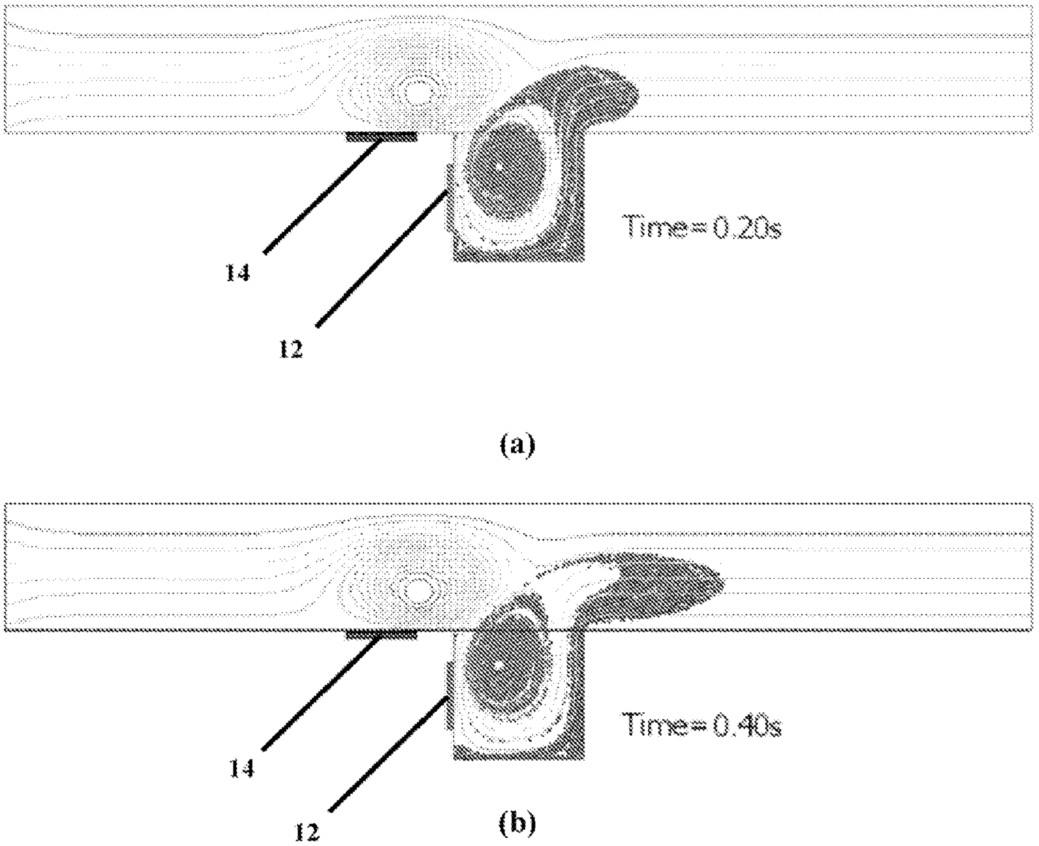
FIGS. 5(*a*) and 5(*b*) graphically illustrate simulation of electrothermally induced flow patterns in a microfluidic cleaning application in accordance with the present invention, with two electrodes having a width of 10 microns positioned 5 microns from the corner of the cavity and with a 5 V AC field applied. The results are shown for 10,000 particles at t=0.2 (FIG. 5(*a*)) and t=0.4 s (FIG. 5(*b*)).

Removal of sub-micron/nano-particles trapped in a channel can be substantially enhanced by combining electrothermally induced flow with pressure-driven flows. To design and implement such a system, a simulation is performed for 20 nm particles initially uniformly distributed in a 20 micron×20 micron cavity along the lower channel wall. Such particle sizes and cavity dimensions are representative of those that exist in typical microfluidic systems. Two electrodes, 12 and 14 having a width of 10 microns are positioned 5 microns from the corner of the cavity and a 5 Vrms AC field is applied. The electrothermally induced flow creates a circulatory flow pattern within the cavity that levitates the particles. A parabolic flow in the channel is used to wash away the levitated particles. The results are shown in FIG. 5 for 10,000 particles configuration at t=0.2 (FIG. 5(*a*)) and t=0.4 s (FIG. 5(*b*)). The electrothermally induced flow can be applied in a periodic manner in order to achieve a higher particle removal rate.

Figure 17:
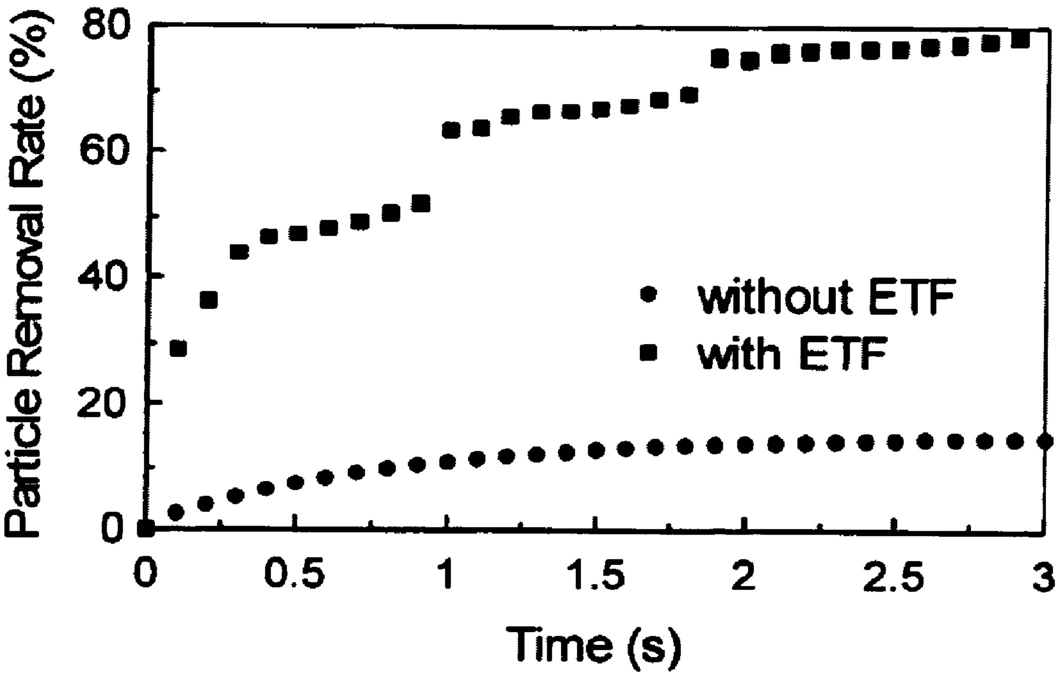
FIG. 17 shows the simulated particle removal rate during the cleaning of a microfluidic device with and without electrothermal flow.

FIG. 17 shows the particle removal rate for periodic electrothermally induced flow with a time period of 0.5 seconds. The particle removal rate is increased by 65% after 3 seconds compared to the case with only pressure driven flow. By properly arranging and optimizing the electrode configuration and operating conditions, it is possible to achieve more thorough cleaning of the cavity in a short time.

Electrode Configuration and Fabrication

Figure 2:
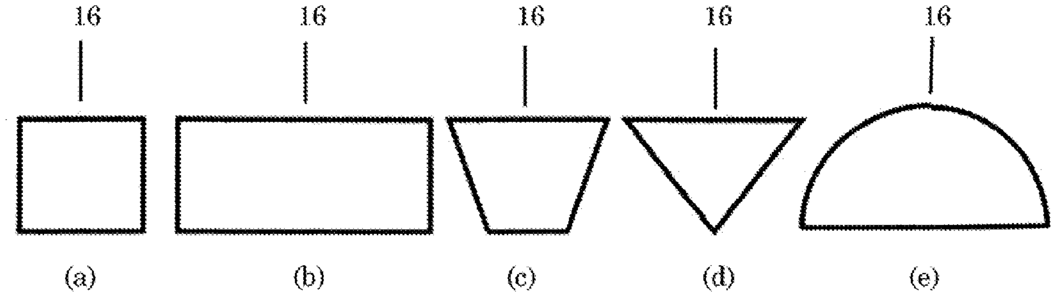
FIGS. 2(*a*)–(*e*) are end views of different microfluidic channels in which electrodes can be used to electrothermally induce flow motion.

At least one pair of electrodes 12, 14 (two discrete planar or curved) is needed to generate the electrothermally induced flow. These electrodes 12, 14 can be oriented in-plane or out of plane (0<=θ<=360 degrees) as shown in FIG. 1. Also, the electrodes can be placed opposite or adjacent each other inside the microchannel or microfluidic device. As shown in FIG. 2, the cross-sectional geometry of the microchannels 16 can be square as shown in FIG. 2(*a*), rectangular as shown in FIG. 2(*b*), trapezoidal as shown in FIG. 2(*c*), triangular as shown in FIG. 2(*d*), or semicircular as shown in FIG. 2 (*e*).

Two basic electrode configurations can be used in simulations and in physical electrodes (along the surface of the microchannel); and (ii) a pair of electrodes placed on each surface of a wedge region. Analytic study of electrothermal flow in a wedge region due to a pair of in-plane electrodes on each surface, forming an angle of 0 (see FIG. 1), shows that a pair of circulation zones is generated, in which the fluid is pulled toward the vertex of the wedge or otherwise depending on the properties of the fluid as well as frequency of the applied electric field. The induced flow will enable sample mixing or cleaning.

Methods for fabrication of microelectrodes on substrates are known. The most common method is photolithography which is well established in the semiconductor industry, as taught in X. Wang et. al. 2000 'Cell separation by dielectrophoretic field-flow-fractionation', *Anal. Chem.* 72, 832–839, which is incorporated herein by reference. Using this method, others have used microelectrode arrays to separate biological cells using dielectrophoresis. (M P. Hughes & H. Morgan 1999 'Dielectrophoretic characterization and separation of antibody-coated submicrometer latex sphere', *Anal. Chem.* 71, 3441–3445.) (incorporated by reference). A variation of this technique is direct-write electron beam lithography. Both methods are capable of fabricating multiple layers of metals on glass substrate. T. Muller et. al. 1999 'A 3-D microelectrode system for handling and caging single cells and particles', *Biosensors & Bioelectronics* 14, 247–256 (incorporated by reference) has developed a sophisticated procedure which combines laser ablation and photolithography to construct three dimensional microelectrodes on a glass substrate.

The simulation-based design and optimization process using CFD-ACE+software, for example, described in the previous section, will also be useful in the investigation and development of various devices/concepts using electrothermally induced flow phenomena. The methods and the systems that are described in the present invention related to sample mixing and cleaning in microsystems can be readily applied in other applications such as micropumps, microreactors, microjets, active valves and particle/cell sorting and counting. These devices find applications in the BioMEMS/biotechnology industry in the field of proteomics, genomics, diagnostics and high-density chemical analysis applications, and in polymerase chain reaction (PCR) chips.

Thus, although there have been described particular embodiments of the present invention of new and useful Methods and Systems Employing Electrothermally Induced Flow for Mixing and Cleaning in Microsystems, it is not intended that such references be construed as limitations upon the scope of this invention except as set forth in the following claims.

What is claimed is:

1. A method of mixing liquids in a microfluidic channel comprising:

a. placing at least two buffer solutions inside the channel, at least one buffer solution having a temperature-dependent dielectric property;

b. applying a potential difference to at least one pair of electrodes separated by a gap and positioned within one or more walls of the channel to induce a temperature gradient and non-uniformity of the dielectric property within at least one of the buffer solutions; and c. controlling the applied potential difference whereby the non-uniformity of the dielectric property is produced within at least one of the solutions generates a flow motion within the solution wherein fluid is expelled away from or pulled toward the gap between electrodes.

2. The method of claim 1 wherein the potential difference applied between at least one pair of electrodes is a time varying, constant direct current (DC), or an alternating current (AC) potential difference.

3. The method of claim 2 wherein the step of controlling the applied potential difference comprises controlling the voltage, waveform, and/or frequency of the applied potential difference.

4. The method of claim 2 wherein the step of controlling the applied potential difference comprises adjusting the position of at least one of the electrodes in the wall of the channel.

5. The method of claim 3 wherein the channel comprises a plurality of interior channel surfaces and each of at least one pair of electrodes is positioned within the walls of different interior channel surfaces.

6. The method of claim 5 wherein the channel comprises a cavity.

7. The method of claim 5 wherein the step of controlling the potential difference further comprises generating the potential difference at each pair of a plurality of electrodes pairs in a predefined sequence.

8. A method of cleaning a microfluidic channel comprising:

a. placing a buffer solution inside the channel, the buffer solution having a temperature-dependent dielectric property;

b. applying a potential difference between at least one pair of electrodes separated by a gap and positioned proximate to one or more surfaces of the channel to induce a temperature gradient within the buffer solution;

c. controlling the applied potential difference whereby the temperature gradient induced in the solution produces a non-uniformity of the dielectric property within the solution; and d. controlling the applied potential difference whereby the non-uniformity of the dielectric property produced within the solution causes fluid to be expelled away from or pulled toward the gap between the electrodes.

9. The method of claim 8 wherein the applied potential difference is a time varying or constant direct current (DC) or an alternating current (AC) electric field generated between electrodes positioned within the same or two adjacent surfaces of the channel.

10. The method of claim 9 wherein the step of controlling the applied potential difference comprises controlling the voltage, waveform, and frequency of the electric field.

11. The method of claim 9 wherein the step of controlling the applied potential difference comprises adjusting the position of the electrodes proximate the surface of the channel.

12. The method of claim 9 wherein the channel comprises a plurality of channel surfaces and the potential difference is applied between a plurality of electrode pairs, each of the plurality of electrode pairs positioned within the same or two adjacent surfaces of the channel.

13. The method of claim 12 wherein the step of controlling the applied potential difference further comprises applying the potential differences at each electrode pair in a predefined sequence.

* * * * *